United States Patent [19]

Karakama et al.

[11] Patent Number: 4,984,603
[45] Date of Patent: Jan. 15, 1991

[54] FLOW CONTROL VALVE ASSEMBLY

[75] Inventors: Tadao Karakama; Naoki Ishizaki; Toshiro Takano; Sadao Nunotani, all of Kanagawa, Japan

[73] Assignee: Kabushiki Kaisha Komatsu Seisakusho, Tokyo, Japan

[21] Appl. No.: 425,162

[22] PCT Filed: Feb. 28, 1989

[86] PCT No.: PCT/JP89/00203
§ 371 Date: Oct. 17, 1989
§ 102(e) Date: Oct. 17, 1989

[87] PCT Pub. No.: WO89/08291
PCT Pub. Date: Sep. 8, 1989

[30] Foreign Application Priority Data

Feb. 29, 1988 [JP] Japan ................................ 63-44101

[51] Int. Cl.⁵ ............................................. G05D 7/01
[52] U.S. Cl. ......................................... 137/489; 251/35
[58] Field of Search ........................... 137/489; 251/35

[56] References Cited

U.S. PATENT DOCUMENTS 3,777,773 12/1973 Tolbert .
3,987,814 10/1976 Hall .
4,549,566 10/1985 Fujiwara et al. .

FOREIGN PATENT DOCUMENTS 48-97120 12/1973 Japan .
49-67069 6/1974 Japan .
51-110725 9/1976 Japan .
52-76733 6/1977 Japan .
57-106909 7/1982 Japan .
60-88283 5/1985 Japan .

Primary Examiner—Gerald A. Michalsky
Attorney, Agent, or Firm—Ronald P. Kananen

[57] ABSTRACT

A flow control valve assembly, for preventing the pressure oil confined in an inlet port of a valve housing from pulsating and for additionally performing a safety valve function without employing a separate safety valve, has a valve housing which is easy in machining thereof and neat in construction. In the valve housing of the flow control valve assembly is formed a valve-receiving bore (21) in which a poppet (32) and a second spool valve (51), serving as a safety valve, are axially aligned with each other in series. In the valve housing (20), a hydraulic operating oil flows to a communication port (39) of the poppet (32) through an inlet port (23) formed in the valve housing (20), and then further flows to a back-pressure chamber portions (38a, 38b) of the poppet (32) through a variable orifice (44). The pressure oil, having been received in the back-pressure chamber portion (38b), flows out of the portion (38b) to an outer peripheral portion of the second spool valve (51). On the other hand, the pressure oil confined in the inlet port (23) flows to a pressure-receiving chamber (56) of the second spool valve (51).

4 Claims, 2 Drawing Sheets

FLOW CONTROL VALVE ASSEMBLY

FIELD OF THE INVENTION

The present invention relates to a flow control valve assembly provided with a safety valve, and more particularly, to a flow control valve assembly in which a safety valve is so incorporated in a flow control valve as to form in the valve assembly a valve housing which is easily machined and is neat in construction.

DESCRIPTION OF THE PRIOR ART

Heretofore, it has been known in the art to provide a flow control valve as shown in FIG. 1.

In such a conventional flow control valve, a back-pressure chamber 4 of a poppet 3, for selectively shutting off an inlet port 1 from an outlet port 2, communicates with the inlet port 1 through an orifice 5. In addition, an oil hole 6, through which the back-pressure chamber 4 communicates with the outlet port 2, is formed in the poppet 3. The oil hole 6 of the poppet 3 is opened and closed in operation by a stem 7 connected to a piston 8. Specifically, in FIG. 1 the piston 8 is rightwardly biased by a compression spring 9 to close the oil hole 6.

On the other hand, the piston 8 is subjected to the pressure of a pilot pressure oil supplied from a pilot conduit (not shown) so that the piston 8 is moved to the left as viewed in FIG. 1 against a resilient force exerted by the compression spring 9 to open the oil hole 6. When the oil hole 6 of the poppet 3 is opened, the pressure oil confined in the back-pressure chamber 4 flows out of the chamber 4 to the outlet port 2 through the oil hole 6 of the poppet 3. As a result, the pressure of the pressure oil in the opposite side areas of the orifice 5 differs from each other to produce a pressure difference which acts on a shoulder portion 3a of the poppet 3 to move the poppet 3 to the left as viewed in FIG. 1 so that the inlet port 1 communicates with the outlet port 2 through a notch portion 10 of the poppet 3. The pressure oil confined in the inlet port 1 thus flows from the inlet port 1 to the outlet port 2. At this time, the flow rate of the pressure oil is controlled by the pilot oil pressure which causes the piston 8 to move leftwardly.

In the conventional flow control valve having the above construction, when an extremely high pressure is developed in the pressure oil confined in the inlet port 1, many parts of the flow control valve are damaged. Consequently, in order to prevent such damages to the parts, a safety valve 12 is provided in a communication passage 11 through which the inlet port 1 communicates with the outlet port 2. When the pressure of the pressure oil confined in the inlet port 1 exceeds the pressure setting of the safety valve 12, a piston 13 of the safety valve 12 is moved in opposition to the loading of a spring 14 to permit the pressure oil confined in the inlet port 1 to flow from the inlet port 1 to the outlet port 2 through the communication passage 11. At the same time, the pressure oil confined in the back-pressure chamber 4 flows from the chamber 4 to the outlet port 4 so as to permit the poppet 3 to move leftwardly as viewed in FIG. 1, whereby the inlet port 1 communicates with the outlet port 2.

Since the conventional flow control valve having the above construction does not perform any safety-valve function in itself, it is necessary to separately provide the safety valve 12 as described above. In this case, a communication passage 11 and a bore 16 in which the safety valve 12 is mounted must be additionally formed in a valve housing 15 of the flow control valve through machining. However, such machining of the valve housing 15 is a very cumbersome in operation. In addition, in order to additionally mount the safety valve 12 in the valve housing 15, the valve housing 15 must be a large. These are problems inherent in the conventional flow control valve.

SUMMARY OF THE INVENTION

In view of such circumstances described above, the present invention was made. Consequently, it is an object of the present invention to provide a flow control valve assembly for additionally performing a safety valve function, in a valve housing of which assembly a safety valve is incorporated to permit the valve housing of the assembly to be easily machined and to be a neat valve housing.

According to a first embodiment of the present invention, the above object of the present invention is accomplished by providing:

A flow control valve assembly comprising:

(a) a valve housing provided with: an inlet port communicating with a hydraulic pump to serve as an entrance for hydraulic operating fluid discharged from the hydraulic pump into the valve housing; a first, a second and a third outlet port sequentially formed in the valve housing from the outside of the valve housing to the inside thereof, each of which outlet ports communicates with a tank to serve as an exit of the hydraulic operating fluid from the valve housing, the inlet port in the valve housing is formed between the first and the second outlet ports;

(b) a hollow sleeve-like element which is received in a first valve receiving bore formed in the valve housing, provided with an incurrent port and an excurrent port which correspond to the inlet port and the outlet port, respectively;

(c) a poppet which is provided with: a longitudinal length corresponding to a distance between the first outlet port and the second outlet port; and a large-diameter portion extending from a substantially intermediate portion of the poppet to a rear-end portion thereof, the poppet being received in a hollow portion of the hollow sleeve-like element so as to slidably move between a shutting-off position and a communication position, in which shutting-off position the poppet shuts off the incurrent port from the excurrent port, and in which communication position the poppet permits the incurrent port to communicate with the excurrent port, the poppet being urged into the communication position by the influence of the pressure oil confined in the inlet port so as to act on a shoulder portion of the large-diameter portion of the poppet, while urged into the shutting-off position under the influence of the pressure oil confined in a back-pressure chamber formed in an area adjacent to the rear-end portion of the poppet;

(d) a first spool valve received in a stepped axial bore of the valve housing, which axial bore is formed in the poppet so as to be provided with a small-diameter bore portion and a large-diameter bore portion sequentially disposed from the outside of the valve housing to the inside thereof, the first spool valve being provided with a small-diameter land portion and a large-diameter land portion which corresponds to the small-diameter bore portion of the axial bore and the large-diameter bore portion of the axial bore, respectively;

(e) a first variable orifice formed between a slit-like communication port formed in a front-end side of the poppet and the small-diameter land portion of the first spool valve so as to be disposed in a position corresponding to that of the excurrent port of the sleeve-like element, an opening area of the first variable orifice being adjustable by slidably moving the poppet;

(f) a second variable orifice provided between the second outlet port and the tank;

(g) an axial element inserted into the sleeve-like element so as to be disposed in a position of a rear-end surface side of the poppet, a front-end portion of the axial element being disposed inside the valve housing so as to abut a rear-end surface of the first spool valve; and (h) a second spool valve slidably inserted in a second valve receiving bore formed in the axial element, the second spool valve being urged into its shut-off position under the influence of a resilient force of a spring so as to selectively shut off the back-pressure chamber of the poppet from the third outlet port and urged into its communication position under the influence of the pressure oil confined in a pressure chamber formed in the second valve receiving bore of the axial element for selectively receiving the pressure oil confined in the inlet port.

According to a second embodiment of the present invention, the above object of the present invention is accomplished by providing:

The flow control assembly as set forth above with regard to the first embodiment of the present invention, wherein:

the back-pressure chamber of the poppet is formed between the interior of the poppet and the large-diameter land portion of the first spool valve, while constructed of: a first back-pressure chamber portion communicating with an outlet side of the first variable orifice; and a second back-pressure chamber portion formed between a rear-end surface of the poppet received in the sleeve-like element of a front-end surface of the axial element, the second back-pressure chamber portion of the back-pressure chamber communicating with the first back-pressure chamber portion through an orifice means.

According to a third embodiment of the present invention, the above object of the present invention is accomplished by providing:

The flow control assembly as set forth above with regard to the first embodiment of the present invention, wherein:

the second spool valve is provided with a blind hole into which is inserted a front-end portion of a lever element so as to form an auxiliary pressure chamber which communicates with the pressure chamber through an orifice, the lever element having its base-end portion stationary.

The flow control valve assembly of the present invention constructed as described in the above embodiments thereof has the following advantages:

In the flow control valve assembly of the present invention, since the hydraulic operating fluid or pressure oil flowing out of the incurrent port to the excurrent port is controlled in flow rate by adjusting an opening area of a flow control variable orifice, and also since the second spool valve is moved into its communication position to permit the pressure oil confined in the second back-pressure chamber portion of the second back-pressure chamber to flow out of the second back-pressure chamber to the tank when the pressure of the pressure oil confined in the inlet port exceeds the pressure setting of the valve assembly, it is possible for the poppet to move into its communication position in which the incurrent port communicates with the excurrent port to reduce the pressure of the pressure oil confined in the inlet port.

Consequently, since the flow control valve assembly of the present invention may additionally perform a safety valve function, it is not required for the flow control valve assembly of the present invention to separately provide a safety valve. As a result, it is not required for the valve housing of the flow control valve assembly of the present invention to form additional bores and communication passages for mounting the safety valve therein, so that machining works of the valve housing may be easily conducted and the valve housing may be a neat one due to elimination of a mounting space of a separate safety valve in the valve housing.

In addition, in the flow control valve assembly of the present invention, since the back-pressure chamber is divided into the first and the second back-pressure chamber portion communicating with each other through the orifice, there is no fear that pulsation occurs in the pressure oil confined in the first back-pressure chamber portion when the pressure oil confined in the second back-pressure chamber portion flows to the tank to produce a pulsation flow of the pressure oil. Furthermore, at this time, since the pressure oil confined in the first back-pressure chamber portion pushes the poppet constantly to effect stabilization of the poppet, no pulsation flow occurs in the pressure oil confined in the inlet port.

The above objects, additional objects, additional embodiments and advantages of the present invention will be clarified to those skilled in the art hereinbelow with reference to the following description and accompanying drawings illustrating preferred embodiments of the present invention according to principles of the present invention.

DESCRIPTION OF THE PREFERRED EMBODIMENTS

Hereinbelow, an embodiment of the present invention will be described in detail with reference to Fig. 2.

Figure 1:
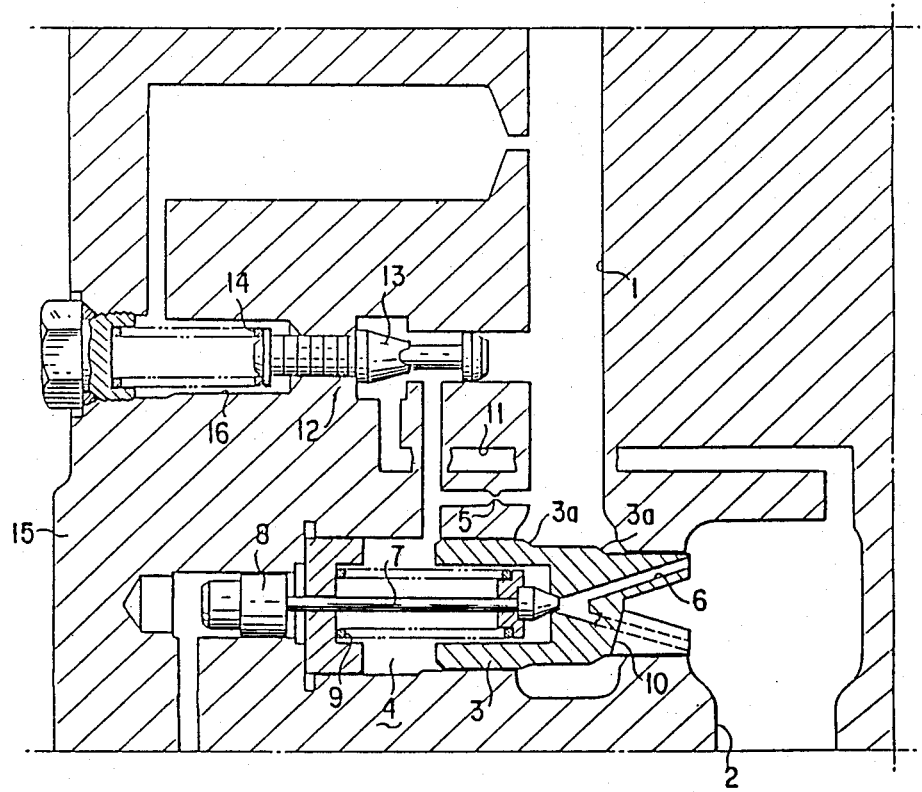
FIG. 1 is a schematic longitudinal sectional view of a conventional flow control valve.
Figure 2:
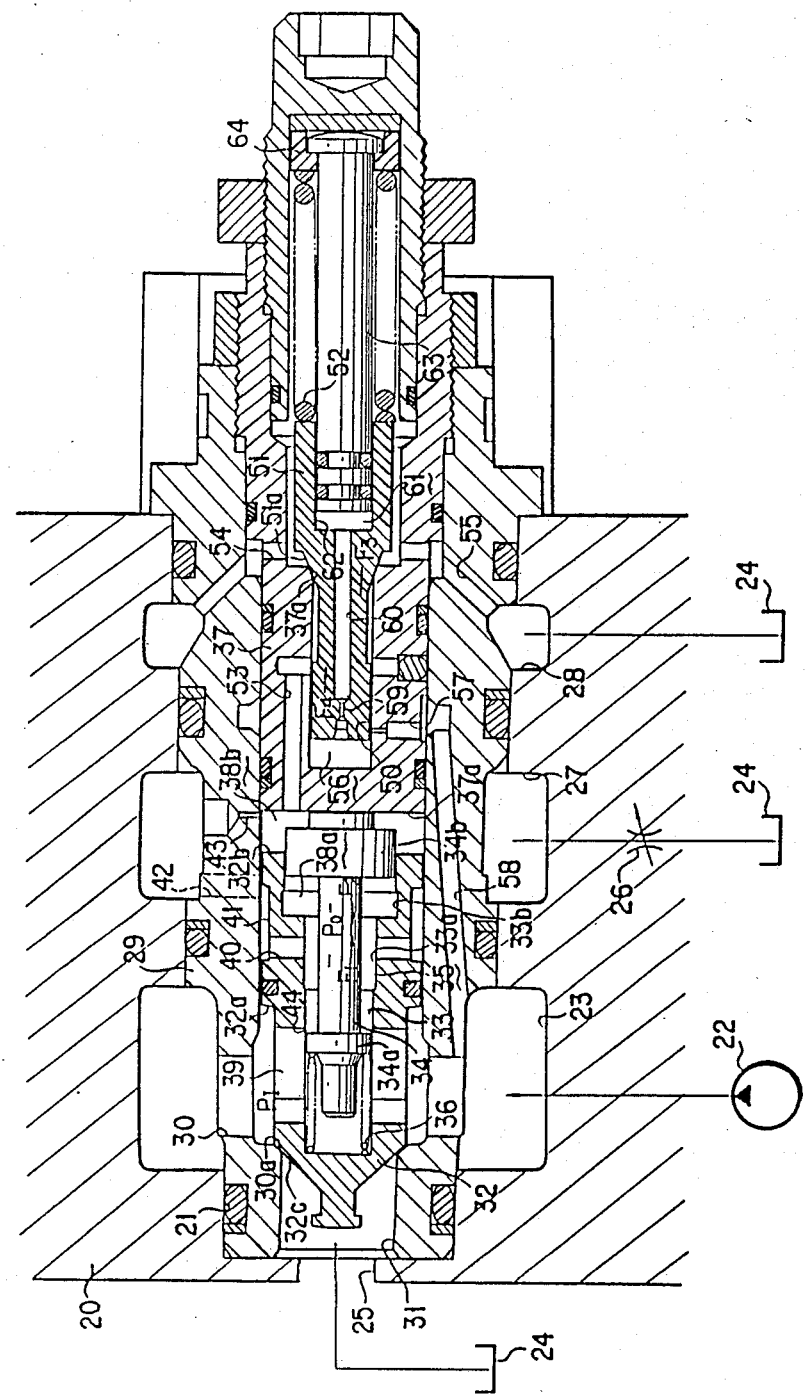
FIG. 2 is a schematic longitudinal sectional view of a preferred embodiment of the present invention.

As shown in FIG. 2, in a valve housing 20 of a flow control valve assembly of the present invention, a first valve receiving bore 21 is formed which comprises an inlet port 23 communicating with an outlet conduit of a hydraulic pump 22; a first outlet port 25 communicating with a tank 24; a second outlet port 27 communicating with the tank 24 through a flow control variable orifice 26 an opening area of which is controlled through an external signal; and a third outlet port 28 communicating with the tank 24. In the first valve receiving bore 21 of the valve housing 20, a sleeve-like element 29 is inserted which comprises an incurrent port 30 which opens into the inlet port 23; and an excurrent port 31 which opens into the first outlet port 25. In the sleeve-like element 29, the incurrent port 30 is selectively opened into the excurrent port 31 through a poppet 32 which is slidably mounted in the sleeve-like element 29. In the interior of the poppet 32 a stepped axial bore 33 is formed constructed of a small-diameter bore portion 33a and a large-diameter bore portion 33b. In the axial bore 33 of the poppet 32 is inserted a first spool valve 34 is formed provided with a small-diameter land portion 34a and a large-diameter land portion 34b. In the axial bore 33 of the poppet 32, an annular chamber 35 is formed between the first spool valve 34 and the small-diameter bore portion 33a of the axial bore 33. On the other hand, a first back-pressure chamber portion 38a is formed between the large-diameter bore portion 33a of the axial bore 33 and the large-diameter land portion 34a of the first spool valve 34. The first spool valve 34 is urged by a spring 36 so as to abut on a front surface 37a of an axial element 37 fixedly mounted in the sleeve-like element 29. On the other hand, a second back-pressure chamber portion 38b is formed between the first spool valve 34 and a rear surface 32b of the poppet 32. The above-mentioned annular chamber 35 communicates with the incurrent port 30 through a variable orifice 44 which is constructed of a slit-like communication port 39 formed in the poppet 32 and the small-diameter land portion 34a of the first spool valve 34. Further, the annular chamber 35 also communicates with the second outlet port 27 through an oil hole 40 formed in the poppet 32; a small-diameter portion 41 of the poppet 32; and another oil hole 42 formed in the sleeve-like element 29. The second back-pressure chamber portion 38b communicates with the second outlet port 27 through an orifice 43.

In the flow control valve assembly of the present invention as discussed above, the pressure oil discharged from the hydraulic pump 22 flows to the second outlet port 27 through the inlet port 23; the incurrent port 30; the variable orifice 44; the annular chamber 35; the oil hole 40; the small-diameter portion 41 of the poppet 32; and the another oil hole. The discharged oil then further flows to the tank 24 through the flow control variable orifice 26. Consequently, the pressure of the pressure oil in opposite side areas of the variable orifice 44 differs from each other to produce a pressure difference. As a result, a pressure $P_1$ of the pressure oil confined in the inlet port 23 acts on a shoulder portion 32a of the poppet 32. At the same time, a pressure $P_0$ of the pressure oil confined in the second outlet port 27, acts on the second back-pressure chamber portion 38b through the first back-pressure chamber portion 38a and an orifice 43.

In the above construction of the present invention, the pressure difference of the pressure oil depends on a flow rate of the pressure oil passing through the variable orifice 44. Since the above flow rate depends on an opening area of the flow control variable orifice 26, the pressure difference of the pressure oil depends on the opening area of the flow control variable orifice 26.

On the other hand, the poppet 32 is subjected to a force $F_1$ rightwardly directed as viewed in FIG. 2; and another force $F_2$ leftwardly directed a viewed in FIG. 2, the force $F_1$ being produced by the pressure oil having the pressure $P_1$ confined in the inlet port 23 to act on the shoulder portion 32a of the poppet 32, and the force $F_2$ being produced by the pressure oil having the pressure $P_0$ confined in the second outlet port 27, first back-pressure chamber portion 38a and the second back-pressure chamber portion 39b. As a result, since there are differences in pressure of the pressure oil and in the pressure-receiving area between the first back-pressure chamber portion 38a and the second back-pressure chamber portion 38b, so that the poppet is moved rightwardly or leftwardly.

In a condition shown in FIG. 2, an opening area of the flow control variable orifice 26 is small to cause the pressure difference of the pressure oil to be small. As a result, the force $F_2$, leftwardly directed as viewed in FIG. 2, is larger than the force $F_1$, rightwardly directed as viewed in FIG. 2, to cause the poppet 32 to move leftwardly so that a seat surface 32c of the poppet 32 abuts on a valve seat 30a, whereby the incurrent port 30 is shut off from the excurrent port 31.

As described above, when that the poppet 30 is held stationary, the pressure oil does not flow into the second back-pressure chamber portion 38b. Therefore, the pressures of the pressure oil of the opposite side areas of the orifice 43 does not differ from each other to produce no pressure difference therein.

When the opening area of the flow control variable orifice 26 is increased relative to that described above, the flow rate of the pressure oil passing through the variable orifice 44 increases to produce a large pressure difference of the pressure oil so that the force $F_1$, rightwardly acting on the poppet 32, becomes larger than the force $F_2$ leftwardly acting on the poppet 32, whereby the poppet 32 is moved rightwardly to separate its seat surface 32c from the valve seat 30a so that the pressure oil flows out of the incurrent port 30 to the excurrent port 31. In FIG. 2, when the poppet 32 moves to the right, the opening area of the variable orifice 44 increases to reduce the pressure difference of the pressure oil. As a result, the poppet 32 is held stationary at a position corresponding to the opening area of the flow control variable orifice 26.

At this time, since the pressure oil confined in the second back-pressure chamber portion 38b flows out of the chamber portion 38b to the tank 24 through the orifice 43, it is possible to control the flow rate of the pressure oil by the orifice 43 to prevent the poppet 32 from being rapidly moved rightwardly.

The above description is directed to the flow control of the pressure oil performed in the flow control valve assembly of the present invention. Now, the safety valve function additionally performed in the flow control valve assembly of the present invention will be described in detail.

In the flow control valve assembly of the present invention, a second spool valve 51 is mounted in a second valve receiving bore 50 formed in the axial element 37, while biased leftwardly by a compression spring 52 so that a seat surface 51a of the second spool valve 51 abuts the valve seat 37a to prevent an incurrent oil hole 53 from communicating with an excurrent oil hole 54. The incurrent oil hole 53 communicates with the second back-pressure chamber portion 38b. On the other hand, the excurrent oil hole 54 communicates with the third outlet port 28 through a port 55 formed in the sleeve-like element 29. A pressure-receiving chamber 56 is formed between the second valve receiving bore 50 and the second spool valve 51, which communicates with the inlet port 23 through a port 57 and a hole 58, and also communicates with an auxiliary pressure-receiving chamber 61 through an oil hole 60 which is provided with an orifice 59 formed in an axially-central portion of the second spool valve 51. The auxiliary pressure-receiving chamber 61 is constructed of a blind hole 62, formed in the second spool valve 51, and defined by a lever element 63 which abuts a spring bearing 64 to cause a force $F_3$ leftwardly directed as viewed in FIG. 2, to act on the second spool valve 51.

On the other hand, another force $F_4$ rightwardly directed as viewed in FIG. 2, also acts on the second spool valve 51. The force $F_4$ is produced by the pressure $P_1$ of the pressure oil confined in the inlet port 23 and the pressure-receiving chamber 56. Since the force $F_4$ is great, the spring 52 is subjected to a large load. In order to reduce the load of the spring 52, the pressure oil having the pressure $P_1$ is allowed to flow into the auxiliary pressure-receiving chamber 61 through the orifice 59 so that still another force $F_3$, leftwardly directed as viewed in FIG. 2, is produced, which force $F_3$ acts on the second spool valve 51 to reduce the force $F_4$, which is rightwardly directed to act on the second spool valve 51.

Incidentally, the pressure-receiving chamber 56 is slightly larger in the pressure-receiving area than the auxillary pressure-receiving chamber 61.

The flow control valve assembly of the present invention has the above construction. Consequently, when the pressure $P_1$ of the pressure oil confined in the inlet port 23 exceeds the pressure setting of the valve assembly of the present invention, the pressure $P_1$ of the pressure oil acting on the pressure-receiving chamber 56 becomes greater to move the second spool valve 51 rightward in opposition to the loading of the spring 52 so that the seat surface 51a of the spool 51 separates from the valve seat 37a, whereby the incurrent oil hole 53 communicates with the excurrent oil hole 54.

As a result, since the pressure oil confined in the second back-pressure chamber 38b flows out of the chamber 38b to the tank 24 through the incurrent oil hole 53, excurrent oil hole 54, port 55 and the third outlet port 28, the force $F_2$, leftwardly acting on the poppet 32, decreases to permit the poppet 32 to move to the right, as viewed in FIG. 2, under the influence of the pressure $P_1$ of the pressure oil confined in the inlet port 23. The pressure $P_1$ acts on the shoulder portion 32a of the poppet 32 so that the seat surface 32b of the poppet 32 separates from the valve seat 30a, whereby the incurrent port 30 communicates with the excurrent port 31 to permit the pressure of the pressure oil confined in the incurrent port 30 to decrease so that a safety valve function is performed.

In this case, when the pressure oil confined in the second back-pressure chamber portion 38b flows out of the chamber portion 38b to the tank 24, pulsation occurs in the pressure oil confined in the second back-pressure chamber portion 38b. Due to such pulsation, the force $F_2$ leftwardly acting on the poppet 32, varies. However, since the pressure-receiving area of the second back-pressure chamber portion 38b is small, and, since there is no pulsation in the pressure oil confined in the first back-pressure chamber portion 38a due to provision of the orifice 43, variation of the force $F_2$, leftwardly acting on the poppet 32, is considerably lessened to permit the poppet 32 to be stabilized so that the pressure oil confined in the inlet port 23 is also substantially stabilized.

Incidentally, it is also possible to integrally form the valve housing 20 with the sleeve-like element 29. In this case, it is possible to eliminate the sleeve-like element 29 by forming a valve-receiving bore in the valve housing 20, which valve-receiving bore is similar in inner peripheral surface shape to the sleeve-like element 29.

We claim:

1. A flow control valve assembly comprising:
   (a) a valve housing provided with: an inlet port communicating with a hydraulic pump to serve as an entrance of hydraulic operating fluid discharged from said hydraulic pump into said valve housing; a first, a second and a third outlet port sequentially formed in said valve housing from the outside of said valve housing to the inside thereof, each of which outlet ports communicates with a tank to serve as an exit of said hydraulic operating fluid from said valve housing, the inlet port in the valve housing being formed between said first and said second outlet ports;
   (b) a hollow sleeve-like element which is received in a first valve receiving bore formed in said valve housing, provided with an incurrent port and an excurrent port which correspond to said inlet port and said outlet port, respectively;
   (c) a poppet which is provided with a longitudinal length corresponding to a distance between said first outlet port and said second outlet port; and a large-diameter portion extending from a substantially intermediate portion of said poppet to a rear-end portion thereof, said poppet being received in a hollow portion of said hollow sleeve-like element so as to slidably move between a shutting-off position and a communication position, in which shutting-off position said poppet shuts off said incurrent port from said excurrent port, and in which communication position said poppet permits said incurrent port to communicate with said excurrent port, said poppet being urged into said communication position by the influence of said pressure oil confined in said inlet port so as to act on a shoulder portion of said large-diameter portion of said poppet, while urged into said shut-off position under the influence of said pressure oil confined in a back-pressure chamber formed in an area adjacent to said rear-end portion of said poppet;
   (d) a first spool valve received in a stepped axial bore of said valve housing, which axial bore is formed in said poppet so as to be provided with a small-diameter bore portion and a large-diameter bore portion sequentially disposed from the outside of said valve housing to the inside thereof, said first spool valve being provided with a small-diameter land portion and a large-diameter land portion which correspond to said small-diameter bore portion of said axial bore and said large-diameter bore portion of said axial bore, respectively;
   (e) a first variable orifice formed between a slit-like communication port formed in a front-end side of said poppet and said small-diameter land portion of said first spool valve so as to be disposed in a position corresponding to that of said excurrent port of said sleeve-like element, an opening area of said first variable orifice being adjustable by slidably moving said poppet;
   (f) a second variable orifice provided between said second outlet port and said tank;
   (g) an axial element inserted into said sleeve-like element so as to be disposed in a position of a rear-end surface side of said poppet, a front-end portion of said axial element being disposed inside said valve housing so as to abut a rear-end surface of said first spool valve; and (h) a second spool valve slidably inserted in a second valve receiving bore formed in said axial element, said second spool valve being urged into its shutting-off position by the influence of a resilient force of a spring so as to selectively shut off said back-pressure chamber of said poppet from said third outlet port and urged into its communication position by the influence of said pressure oil confined in a pressure chamber formed in said second valve receiving bore of said axial element for selectively receiving said pressure oil confined in said inlet port.

2. The flow control valve assembly as set forth in claim 1, wherein:

said back-pressure chamber of said poppet is formed between the interior of said poppet and said large-diameter land portion of said first spool valve, while constructed of: a first back-pressure chamber portion communicating with an outlet side of said first variable orifice; and a second back-pressure chamber portion formed between a rear-end surface of said poppet received in said sleeve-like element of a front-end surface of said axial element, said second back-pressure chamber portion of said back-pressure chamber communicating with said first back-pressure chamber portion through an orifice means.

3. The flow control valve assembly as set forth in claim 1, wherein:

said second spool valve is provided with a blind hole into which is inserted a front-end portion of a lever element so as to form an auxiliary pressure-receiving chamber which communicates with said pressure chamber through an orifice, said lever element having its base-end portion stationary.

4. The flow control valve assembly as set forth in claim 3, wherein:

said pressure-receiving chamber is slightly larger in the pressure-receiving area than said auxiliary pressure-receiving chamber.

* * * * *